(12) United States Patent
Landau et al.

(10) Patent No.: US 10,146,406 B2
(45) Date of Patent: Dec. 4, 2018

(54) META GUIDING INTERFACE FOR AN E-READING DEVICE

(71) Applicant: Kobo Inc., Toronto (CA)

(72) Inventors: Benjamin Landau, Toronto (CA); Vanessa Ghosh, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 327 days.

(21) Appl. No.: 14/503,110

(22) Filed: Sep. 30, 2014

(65) Prior Publication Data

US 2016/0092060 A1    Mar. 31, 2016

(51) Int. Cl.
| | | |
|---|---|---|
| *G06F 3/0483* | (2013.01) | |
| *G06F 3/0488* | (2013.01) | |
| *G06F 3/01* | (2006.01) | |
| *G06F 3/16* | (2006.01) | |
| *G06K 9/00* | (2006.01) | |
| *G09B 21/00* | (2006.01) | |

(52) U.S. Cl.
CPC ........ *G06F 3/0483* (2013.01); *G06F 3/04883* (2013.01); *G06F 3/017* (2013.01); *G06F 3/16* (2013.01); *G06K 9/00335* (2013.01); *G09B 21/008* (2013.01)

(58) Field of Classification Search
None
See application file for complete search history.

(56) References Cited

U.S. PATENT DOCUMENTS

| | | | | |
|---|---|---|---|---|
| 6,115,482 | A * | 9/2000 | Sears ................. | G06F 3/011 348/62 |
| 2010/0175018 | A1* | 7/2010 | Petschnigg ........... | G06F 3/0483 715/776 |
| 2013/0111334 | A1* | 5/2013 | Liang .................. | G06F 3/0488 715/252 |
| 2013/0172022 | A1* | 7/2013 | Seymour .............. | H04M 19/04 455/458 |
| 2016/0062615 | A1* | 3/2016 | Price .................. | G06F 3/04845 715/779 |

* cited by examiner

*Primary Examiner* — Jeffrey A Gaffin
*Assistant Examiner* — John M Heffington
(74) *Attorney, Agent, or Firm* — Oblon, McClelland, Maier & Neustadt, L.L.P.

(57) ABSTRACT

A meta guiding mode can be implemented on a computing device to alter or disable touch inputs that the computing device otherwise recognizes as input.

19 Claims, 6 Drawing Sheets

META GUIDING INTERFACE FOR AN E-READING DEVICE

TECHNICAL FIELD

Examples described herein relate to an e-reading device, and more specifically, to a meta guiding interface for an e-reading device.

BACKGROUND

An electronic personal display is a mobile electronic device that displays information to a user. While an electronic personal display is generally capable of many of the functions of a personal computer, a user can typically interact directly with an electronic personal display without the use of a keyboard that is separate from or coupled to but distinct from the electronic personal display itself. Some examples of electronic personal displays include mobile digital devices/tablet computers such (e.g., Apple iPad®, Microsoft® Surface™, Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, and the like).

An electronic reader, also known as an e-reader device, is an electronic personal display that is used for reading electronic books (eBooks), electronic magazines, and other digital content. For example, digital content of an e-book is displayed as alphanumeric characters and/or graphic images on a display of an e-reader such that a user may read the digital content much in the same way as reading the analog content of a printed page in a paper-based book. An e-reader device provides a convenient format to store, transport, and view a large collection of digital content that would otherwise potentially take up a large volume of space in traditional paper format.

In some instances, e-reader devices are purpose-built devices designed to perform especially well at displaying readable content. For example, a purpose built e-reader device includes a display that reduces glare, performs well in highly lit conditions, and/or mimics the look of text on actual paper. While such purpose built e-reader devices excel at displaying content for a user to read, they can also perform other functions, such as displaying images, emitting audio, recording audio, and web surfing, among others.

There also exist numerous kinds of consumer devices that can receive services and resources from a network service. Such devices can operate applications or provide other functionality that links the device to a particular account of a specific service. For example, e-reader devices typically link to an online bookstore, and media playback devices often include applications which enable the user to access an online media library. In this context, the user accounts can enable the user to receive the full benefit and functionality of the device.

Meta guiding is the visual guiding of the eye using a finger or pointer, such as a pen, in order for the eye to move faster along the length of a passage of text and increase comprehension/focus. Meta guiding is a technique that has been used for many years with reading print books.

DETAILED DESCRIPTION

Figure 1:
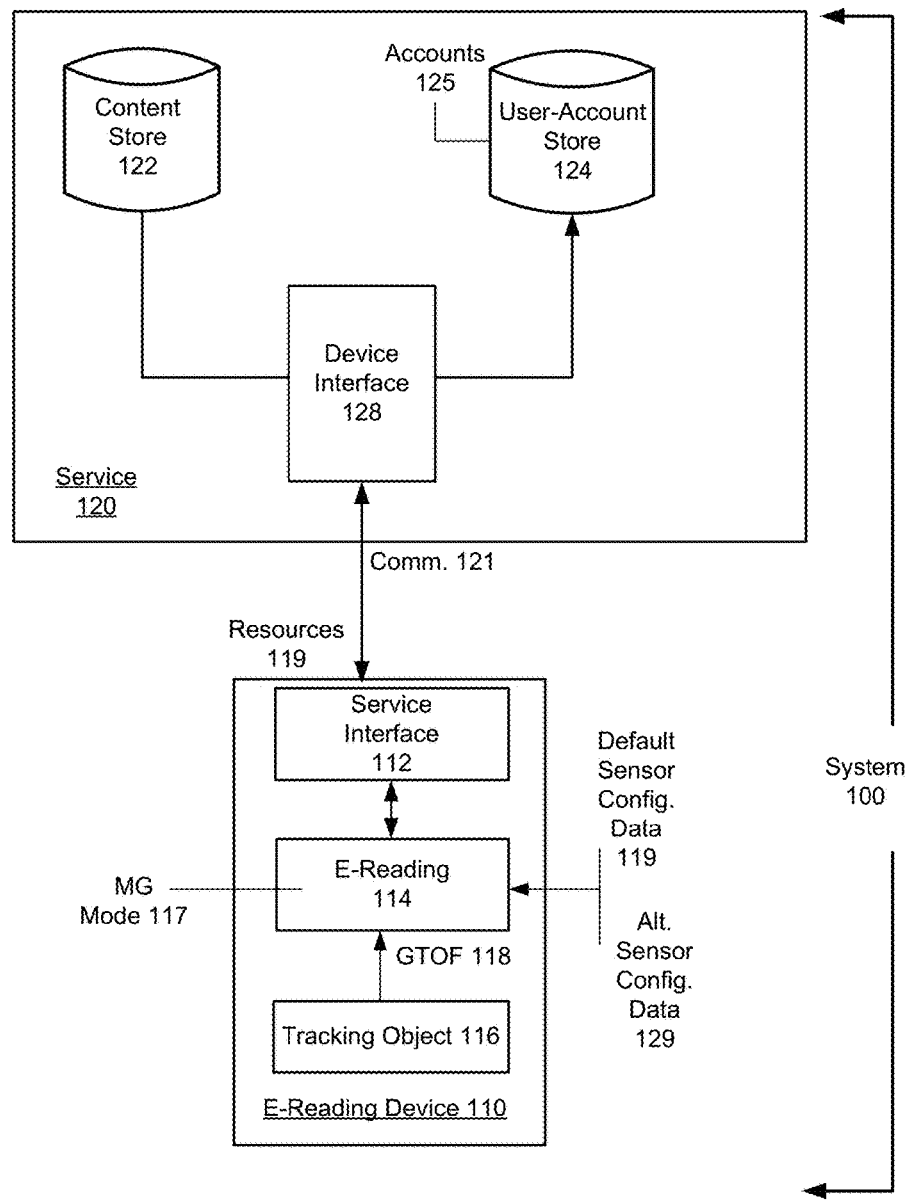
FIG. 1 illustrates a system that utilizes an e-reading device that can operate in a meta guiding mode, according to an embodiment.

According to some embodiments, a computing device having a touch-sensitive display assembly is operable as an e-reading device that can implement a meta guiding mode for e-reading activity. In particular, the meta guiding mode can be implemented on the computing device without interference from a touch-sensitive display, when the touch-sensitivity of the display would otherwise generate inadvertent input as a result of a user continuously moving his finger over a display screen.

In an embodiment, a meta guiding mode can be implemented on a computing device to after or disable touch inputs that the computing device otherwise recognizes as input. In a variation, the computing device can implement the meta guiding mode by automating page transition events. Still further, in other embodiments, the computing device can implement the meta guiding mode by generating a graphic tracker object that moves under lines of text from the e-book.

In some embodiments, a computing device includes a display assembly, a memory resource and a processor. The memory resource stores sensor configuration data for the set of sensors of the display assembly, including (i) a default set of configuration data, and (ii) an alternative set of configuration data. The processor operates to execute an e-reading component in order to render an e-book. When operated in a default mode, the processor uses the default set of configuration data to interpret multiple types of touch input on the display screen, including touch inputs in which a finger or object is moved while in continuous contact with a region of the display screen. When operated in the meta guiding mode, the processor uses an alternative set of configuration data to ignore at least some types of touch inputs, including touch inputs that correspond to a finger or object movement that is in continuous contact with a region of the display screen.

"Sensor configuration data" refers to data that determines how sensor values will be interpreted by a processor. Among other examples, sensor configuration data can reflect when and if sensor values are recognized as input, as well as what kinds of input actions are detected as input.

An "e-reading device" can refer to any computing device that can display or otherwise render an e-book. By way of example, an e-reading device can include a mobile computing device on which an e-reading application can be executed to render content that includes e-books (e.g., comic books, magazines etc.). Such mobile computing devices can include, for example, a mufti-functional computing device for cellular telephony/messaging (e.g., feature phone or smart phone), a tablet device, an ultramobile computing device, or a wearable computing device with a form factor of a wearable accessory device (e.g., smart watch or bracelet, glass ware integrated with computing device, etc.). As another example, an e-reading device can include an e-reader device, such as a purpose-built device that is optimized for e-reading experience (e.g., with E-ink displays etc.).

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates a system that utilizes an e-reading device that can operate in a meta guiding mode, according to an embodiment. The network service 120 may include multiple servers and other computing resources that provide various services in connection with one or more applications that are installed on the e-reading device 110. By way of example, in one implementation, the network service 120 can provide e-book services which communicate with corresponding e-reading functionality provided on the e-reading device 110. The e-book services can enable e-books (including electronic magazines and other periodicals) to be downloaded or archived from e-reading device 110. The network service 120 can also provide other forms of content for download or streaming, such as videos or music. In this way, the network service 120 can provide various other content services, including content rendering services (e.g., streaming media) or other network-application environments or services.

The e-reading device 110 can correspond to any electronic personal display device having a touch-sensitive display assembly, and further on which applications and application resources (e.g., e-books, media files, and documents) can be rendered and consumed. For example, the e-reading device 110 can correspond to a tablet or a telephony/messaging device (e.g., smart phone). In one implementation, for example, e-reading device 110 can correspond to a mobile computing device (e.g., tablet) that runs an e-reading application to link the device to the network service 120 in order to enable e-books provided through the service to be viewed and consumed. Still further, by way of example, the e-reading device 110 can be equipped with hardware and software to optimize certain application activities, such as rendering of electronic content (e.g., e-books, including electronic magazines and other periodicals). For example, the e-reading device 110 can have a tablet like form factor, although variations are possible. In some cases, the e-reading device 110 can also have an E-ink display with touch or contact sensors.

In additional detail, the network service 120 can include a device interface 128, a resource store 122 and a user account store 124. The user account store 124 can associate the e-reading device 110 with a user and with an account 125. The account 125 can also be associated with one or more application resources (e.g., content item such as an e-books), which can be stored in the resource store 122. As described further, the user account store 124 can retain metadata for individual accounts 125 to identify resources that have been purchased or made available for consumption for a given account. The e-reading device 110 may be associated with the user account 125, and multiple devices may be associated with the same account. As described in greater detail below, the e-reading device 110 can store resources (e.g., e-books) that are purchased or otherwise made available to the user of the e-reading device 110, as well as to archive e-books and other digital content items that have been purchased for the user account 125, but are not stored on the particular computing device.

The e-reading device 110 can include a service interface 112 and an e-reading component 114. The e-reading device 110 can execute the service interface 112 to receive resources and data from the network service 120. The service interface 112 can signal, to the network service 120, an identifier for the user and/or user account. The service interface 112 can interface with the network service 120 to receive resources such as applications and content items (e.g., e-books, music files, etc.) from the network service. Optionally, the e-reading device 110 can communicate with multiple services in order to receive resources. The resources that can be received can be responsive to user-input or action (e.g., purchasing input), or automated (e.g., automatic download of new issue of periodical based on user subscription data).

The e-reading device 110 can execute the e-reading component 114 to enable e-reading activities. In one aspect, the e-reading component 114 can render paginated content from e-books (e.g., electronically formatted literary works). Many e-books, such as literary works which are primarily text-based (e.g., novels) can be paginated on-the-fly by the e-reading component 114, based on, for example, a display size of the device and/or font size settings of the user or device.

According to some embodiments, the e-reading component 114 can operate in any one of multiple possible operational modes, including a default mode and a meta guiding mode. However, the meta guiding mode provides for the user to move his or her finger across the display screen, and this action can be confused with input, particularly in cases when the default mode of the computing device recognizes gesture inputs such as swipes.

In one implementation, the e-reading device 110 stores data for implementing a default mode and a meta guiding mode ("MG mode 117"). In the default mode, the e-reading device 110 can process touch input as determined by a default set of sensor configuration data 129. When the default set of sensor configuration data 129 are used, the e-reading device 110 can, for example, detect a library of different kinds of touch inputs and gestures. However, touch gestures are generally problematic when meta guiding is being performed. In particular, if the e-reading device 110 is able to process gestures (e.g., swipes) and other inputs which maintain continuous contact of the user's finger over a distance of a display screen, then implementation of meta guiding mode 117 can yield inadvertent touch inputs by the user, particular since meta guiding reading provides for the user move his finger under a line being read.

Accordingly, the meta guiding mode 117 can be based on sensor configuration data 119 which alters or reconfigures the values that can be obtained from touch sensors provided with the display assembly of the e-reading device 110. Accordingly, the values that can be interpreted from the sensor configuration data 129 of the meta guiding mode 117 can be a subset of the touch inputs available when the default mode is in use. In particular, the sensor configuration data 129 of the meta guiding mode 117 can alter or reconfigure the values that can be obtained from the touch sensors of the display screen, as compared to the default mode. In one implementation, when operating in the meta guiding mode 117, the sensor configuration data 119 can disable, or otherwise eliminate the ability of the e-reading device 110 to interpret gestures or other touch inputs that are likely to be inadvertently detected as a result of, for example, the user's finger movement when performing meta guiding. More generally, gestures such as swipes provide an example of a continuous and moving contact as between the user finger or object and the display screen device. In some variations, the e-reading device 110 replaces touch input types which are likely to be misinterpreted when the meta guiding mode is performed by a user. Such touch inputs can be replaced with, for example, touch inputs which are discrete, such as taps or double taps. Thus, for example, in the default mode, a gesture such as a finger swipe can have a programmatic interpretation (e.g., page turn), while in the meta guiding mode, the same operation can be assigned to another input action (e.g., tap or double tap) and the finger swipe is unassigned or disabled.

In another implementation, the sensor configuration data 119 can provide for the e-reading device 110 to disable all of the touch sensor functionality provided to the device as a whole, or alternatively to the e-reading component 114, so as to preclude the possibility of inadvertent touch inputs.

Still further, in some embodiments, the meta guiding mode 117 can be in effect when, for example, the e-reading device 110 executes the e-reading component 114. For example, the meta guiding mode 117 can be implemented exclusively with operation of the e-reading component 114.

With further reference to an example of FIG. 1, the e-reading device 110 can include a tracking object component 116. The tracking object component 116 can be implemented as a standalone application of process, or alternatively as an integrated process are component of that e-reading component 114. The tracking object component 116 can optionally generate a graphic tracking object feature 118 ("GTOF 118") to facilitate meta guiding reading activity. More specifically, GTOF 118 can move progressively along the lines of text content for any book or other text-based content. The use of GTOF 118 provides an alternative to the use of a finger or object, which requires physical exertion and coordination by the user. Examples as to how the GTOF 118 can be implemented is described with a method of FIG. 4, as well as shown with examples of FIG. 5A and FIG. 5B.

Hardware Description

Figure 2:
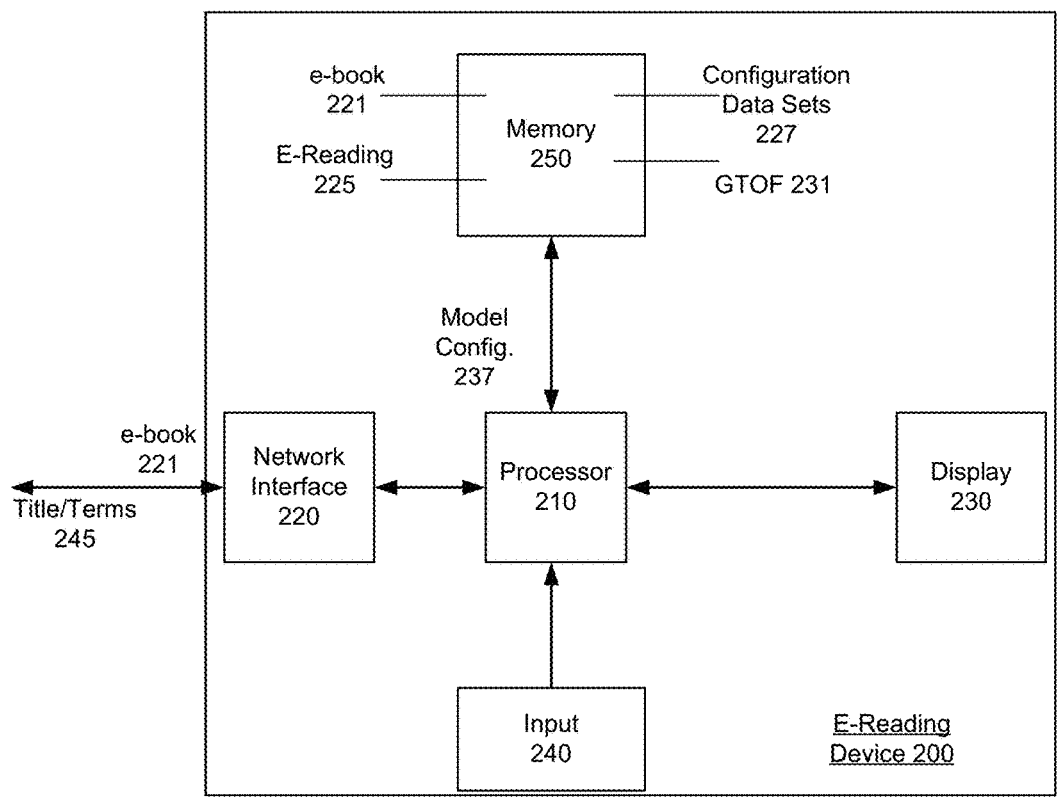
FIG. 2 illustrates an example of an e-reading device for use with one or more embodiments described herein.

FIG. 2 illustrates an example of an e-reading device for use with one or more embodiments described herein. In an example of FIG. 2, an e-reading device 200 can correspond to, for example, a mobile computing device such as shown by an example of FIG. 1.

With reference to FIG. 2, e-reading device 200 includes a processor 210, a network interface 220, a display 230, one or more input mechanisms 240, and a memory 250. The processor 210 can implement functionality using instructions stored in the memory 250. Additionally, in some implementations, the processor 210 utilizes the network interface 220 to communicate with the network service 120 (see FIG. 1). More specifically, the e-reading device 200 can access the network service 120 to receive various kinds of resources (e.g., digital content items such as e-books, configuration files, account information), as well as to provide information (e.g., user account information, service requests etc.). For example, e-reading device 200 can receive application resources, such as media files (e.g., e-books 221) that the user elects to purchase or otherwise download from the network service 120. The application resources that are downloaded onto the e-reading device 200 can be stored in the memory 250.

In some implementations, the display 230 can correspond to, for example, a liquid crystal display (LCD) or light emitting diode (LED) display that illuminates in order to provide content generated from processor 210. In some variations, the display 230 can correspond to an electronic paper type display, which mimics conventional paper in the manner in which they display content. Examples of such display technologies include electrophoretic displays, electrowetting displays, and electrofluidic displays.

In some implementations, the display 230 can be touch-sensitive. For example, the display 230 can be integrated with a sensor layer that is comprised of capacitive touch sensors which trigger with contact to human skin. Alternatively, the display 230 can include alternative sensor layers, such as resistive sensors which can detect applied pressure from, for example, a human finger or stylus.

The processor 210 can receive input from various sources, including from input mechanisms 240 (e.g., buttons or switches, microphone, keyboard), the display 230 (e.g., soft buttons or virtual keyboard) or other input mechanisms (accessory devices). In one implementation, the processor 210 can process multi-touch input detected by the sensor layer provided on the display 230.

In one aspect, memory 250 stores instructions 225 ("e-reading instructions 225") for operating an e-reading application (e.g., see e-reading component 114 in FIG. 1). The memory 250 can also store sensor configuration data sets 227 for implementing different configurations for touch (or contact sensors) of the display assembly 230. As described with other examples, the sensor configuration data sets 227 can include each of a default and alternative configuration data set. Each of the default and alternative sensor configuration data set can be utilized in a corresponding mode of operation for the e-reading device 110.

According to one aspect, the user can make a mode selection in regards to the manner in which e-reading activities are performed. A user can provide a setting or input information to switch from the default mode to an alternative mode, such as provided by the meta guiding mode of operation. For example, the e-reading device 200 can implement a default mode, in which the default set of sensor configuration parameters are used to interpret sensor data from the touch sensors of the display assembly 230. In this mode, a full library of input actions can be available for different applications and interfaces, including for the e-reading component 114 (which can be executed by the e-reading instructions 225). The input actions of the user can be sensed and interpreted using the default set of configuration parameters, which then interpret the input actions. By way of example, in the default mode, gesture input corresponding to a swipe can be interpreted as a page turn and/or chapter turn.

The meta guiding mode can be implemented using an alternative set of sensor configuration parameters 227B. These parameters can disable or otherwise ignore certain types of touch input actions, such as swipes or continuous movement on the displays screen of the display assembly 230. Thus, the available library of input actions that can be recognized in the meta guiding mode may be smaller than that of the default mode.

Furthermore, certain operations which in the default mode are assigned to a particular type of touch input can be reassigned to a different type of touch input in the meta guiding mode. In particular, page and chapter turns can be assigned to input actions such as taps or double taps, which are distinguishable from the continuous movement present when meta guiding is being performed.

Still further, memory resources 250 can also store instructions for implementing a graphic tracking object feature ("GTOF 231"). The GTOF instructions 231 can be implemented to create a programmatic tracking object that simulates or otherwise performs the function of the user finger when meta guiding is performed. FIG. 4 and FIG. 5A and FIG. 5B each illustrate examples for the use of programmatically generated tracking objects to facilitate meta guiding.

Device System

Figure 3:
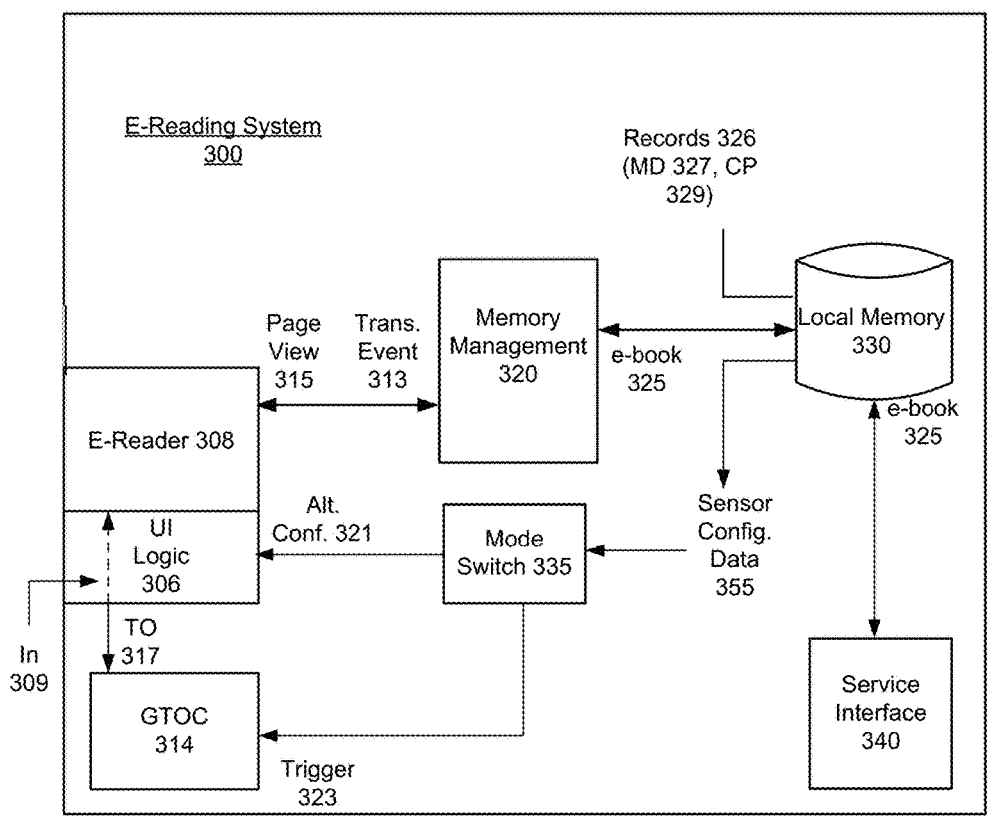
FIG. 3 illustrates an e-reading system that is capable of providing a meta guiding mode, according to one or more embodiments.

FIG. 3 illustrates an e-reading system that is capable of providing a meta guiding mode, according to one or more embodiments. In particular, a system 300 can provide a meta guiding mode as an optional mode of operation. The system of 300 can further be include an e-reading device that provides for a touch-sensitive display assembly, such as described with an example of FIG. 2. As described below, a meta guiding mode can be implemented on the e-reading device of system 300, and the incidence of inadvertent contact with the display assembly of the e-reading device can be avoided or significantly mitigated through alterations to the sensor configurations parameters when meta guiding is performed. Additionally, some embodiments provide for computer-assisted meta guiding, in which a graphic tracking object feature can be generated and used in place of a user finger or object.

In more detail, system 300 implements programmatic components for communicating with one or more network service (such as network service 120, shown in FIG. 1), as well as for enabling functionality for viewing and accessing content items (e.g., e-books) utilized by an account associated with the e-reading device 110 (see FIG. 1). In some embodiments, the system 300 can be implemented as an application that runs on an e-reading device, such as shown with examples of FIG. 1 or FIG. 2. In variations, the system 300 can be implemented as part of the operating system for the e-reading device.

In an example of FIG. 3, system 300 includes a user interface 310, a memory management module 320, a local memory 330, and a service interface 340. Some or all of the programmatic components shown with the computing system 300 can be provided in part as operating system-level components. Alternatively, the programmatic components shown with the computing system 300 can be provided as part of an application or application platform that runs on, for example, the e-reading device 110 (see FIG. 1). For example, the user can download an application onto the device that is operated as the e-reading device 110, in order to obtain functionality such as described with an example of FIG. 3, as well as to communicate with the network service 120. Alternatively, an application can be embedded or otherwise preinstalled with other programmatic elements for providing functionality such as described with system 300.

The service interface 340 includes application logic which enables the e-reading device 110 to use, for example, a wireless Internet connection, to connect to the network service 120 (see FIG. 1). In connecting with the service, the service interface 340 can transmit data that enables the network service 120 to identify the e-reading device 110 on which system 300 is implemented, so that the network service 120 can determine the account that is associated with the particular e-reading device. The service interface 340 can be used to retrieve e-books 325 from the network service 120. For example, in identifying the e-reading device 110 of system 300 to the network service 120, the network service may be able to procure payment information (e.g., stored credit card information) that can be used to charge the user's account when the user purchases a new e-book from the service. Each e-book can correspond to a literary work having a pagination format, such as provided by literary works (e.g., novels). Other e-books can have pagination which is statically predetermined, such as in the case of some periodicals (e.g., magazines, comic books, journals, etc.). Optionally, some e-books may have chapter designations, as well as content that corresponds to graphics or images (e.g., such as in the case of magazines or comic books). Individual e-books 325 also include metadata 327, such as imagery provided as a cover for the e-book when the e-book is marketed (e.g. similar to the manner in which a conventional hardbound book would be marketed in a retail store). In one implementation, the network service 120 can retrieve or otherwise identify the imagery and other metadata 327 of individual e-books from publisher sources.

In identifying the e-reading device of system 300, the network service 120 can identify what e-books belong to the account associated with the particular device. The e-books that are transmitted to the e-reading device of system 300 can include, for example, those e-books that are purchased from the device, or those e-books that the user requested to download. In variations, e-books can be automatically downloaded to the device in response to occurrence of certain conditions. For example, the user can purchase an e-book on another device, and then subsequently connect to the network service 120 via the e-reading device 110 to automatically receive their previously purchased e-book. As another example, network service 120 can be configured to push e-books to the e-reading device 110 of system 300, based on, for example, user account settings, subscription plans and rules, and various other business logic considerations.

Additionally, the service interface 340 can include processes for automatically receiving updates from a network service 120. The update can include programmatic updates, including updates to software components on the e-reading device 110, as well as updates to lists, download of e-books that the user may have purchased on another device of the same account, recommendations from the network as to what a given user may want to purchase or view, and/or various other data that can be either generally provided to the user of the network service or specifically provided for to the particular account or user.

According to some embodiments, the local memory 330 stores each e-book as a record 326 that includes metadata 327 and content 329 (e.g., page content). The memory management module 320 can include distributed memory resources, such as cache resources utilized by the e-reading component 308. The memory management module 320 can retrieve portions of the content 329 for individual e-books for purpose of rendering e-books via the user interface 310. Additionally, the memory management module 320 can retrieve metadata 327 to render metadata content (e.g., representations of e-books or lists of e-books) with the user interface 310.

In an example of FIG. 3, the user interface 310 of e-book system 300 includes user interface logic 306 and an e-reading component 308. The user interface logic provides rules, parameters and other logic to interpret input for the different modes that can be implemented on the device of system 300. The e-reading component 308 renders e-books and other text content.

The e-reading component 308 can include functionality to (i) render page views 315 from a particular e-book, and (ii) detect page events 313. The page views 315 can include the content portion 329 of the e-book being read (e.g., opened or rendered). For example, the e-reading component 308 can display a page view 315 from an e-book corresponding to a novel or periodical, and the page view may include text and/or image content. The page event 313 can correspond to, for example, a page turn, a chapter turn, or a clustered page turn.

In more detail, the computing device of system 300 enables the user to specify settings or other input for purpose of implementing a mode switch 335 when performing e-reading activity. As described with other examples, the mode switch 335 can switch the modal operation of the device of system 300 from a default mode to a meta guiding mode. Under conventional approaches, meta guiding requires physical effort in the form of the user moving a finger or object to increase the user's reading speed. However, since a display assembly of system 300 can be assumed as being touch sensitive, simple finger tracking (as conventionally performed with meta guiding) can be problematic because the continuous moving contact of the finger on the display surface can be inadvertently interpreted as a gesture input (e.g., finger swipe).

The mode switch 335 can be triggered by user input, such as provided through a setting or other input interface. The mode switch 335 can trigger configuration of the user interface logic 306 using sensor configuration data 355 of the selected mode (e.g., meta guiding mode). For example, a set of sensor configuration parameters for meta guiding ("alternative sensor configuration parameters 321") can be implemented by the user interface logic 306. As described in greater detail, the sensor configuration parameters 321 can configure the user interface logic 306 so as to limit the number of touch input types that can recognized in that mode. This allows the user to touch the display surface of the computing device in order to perform meta guiding.

In one implementation, the user interface logic 306 can operate in connection with the e-reading component 308. Under default settings, the user interface logic 306 interprets a full library of touch inputs and gestures (e.g., swipes), while under the meta guiding mode, the user interface logic 306 interprets either (i) a limited number of input actions, while disabling those gestures and input actions which can sufficiently resemble linear movement or (ii) disables touch input activity. In the former case, each of the limited number of input actions that are available in the meta guiding mode can be assigned to operations that have other assigned input actions when implemented in the default mode. For example, page turning can be assigned to (i) a swipe gesture when the default mode is in operation, and to (ii) a tap or double tap when meta guiding mode is being implemented. As noted, variations also provide for disabling the touch input activity entirely, thereby precluding possibility of inadvertent inputs from, for example, accidental taps.

According to one aspect, meta guiding is implemented in part by changing the manner in which the user interface logic 306 interprets input in connection with activity of e-reading component 308. This change, in and of itself, promotes the ability of the user to manually perform meta guiding, in that the user is able to track a finger or object under displayed lines of text, while the object or finger of the user moves across a touch sensitive display screen. In variations, computer-generated enhancements can be made to reduce or eliminate the need for the user to use his finger or otherwise remain manually involved with meta guiding.

According to an embodiment, a graphic tracking object component ("GTOC") 314 can be implemented to virtualize a tracking object used for meta guiding. In one implementation, mode switch 335 can trigger the GTOC 314 into generating the tracking object 317, which can be rendered with the text through the e-reading component 308. As an addition or alternative, the initiation of GTOC 314 can be in response to user selection input.

The GTOC 314 generates the tracking object 317, which can graphically be represented as any type of object, such as a graphic or virtual finger, an underline, or a highlight. The tracking object 317 can be moved under lines of text being rendered through the e-reading component 308. One significant characteristic of the tracking object 317 as implemented can include the velocity of the tracking object (e.g., the speed of the tracking object, such as measured by words per minute). In one implementation, the velocity of the tracking object 317 is set by default, based on, for example, common usage preferences of a population users. Once set, the user can provide input 309 through, for example, user interface logic 306 in order to after the velocity of the tracking object 317. In the variation, the user can be directed to perform a training process where the user performs a manual meta guiding session. During the session, an estimation of the velocity needed for the tracking object 317 can be made based on a finger speed of the user.

The manner in which the e-reading component 308 handles page end can also be one of design or user preference. In one implementation, the e-reading component 308 can be configured (e.g., by alternative sensor configuration parameters 321) to detect and interpret the presence of the tracking object 317 at or near the last word of a page as being a page turn event. In response to determining the page turn event, the e-reading component 308 can automatically perform a page turn.

In a variation, the e-reading component 308 can perform a page turn in response to user input, such as in response to a button press or screen tap. Thus, for example, the tracking object 317 can arrive at the last word of a displayed page, at which point the e-reading component 308 will wait for a confirmation input before transition to the next page.

Among other benefits, an example of FIG. 3 provides a user with an option to implement meta guiding using a graphical tracking object feature, thereby reducing or eliminating a need of the user to maintain a finger on the display screen when performing meta guiding. As compared to meta guiding with printed books, an example of FIG. 3 increases user comfort and further allows the user the ability to multitask. Additionally, the user can exercise a preference to perform manual meta guiding by guiding his or her finger across the display screen of the computing device while viewing rendered content from a selected e-book.

Methodology

Figure 4A:
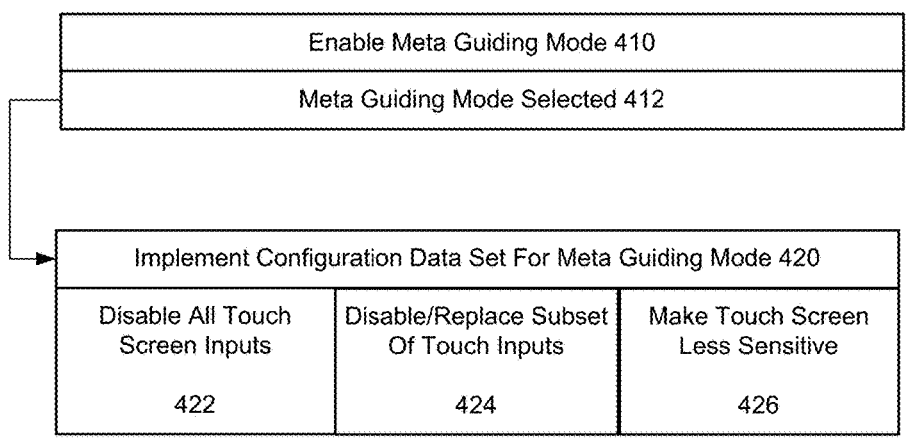
FIG. 4A illustrates an example method for operating an e-reading device to provide a meta guiding mode, according to an embodiment.
Figure 4B:
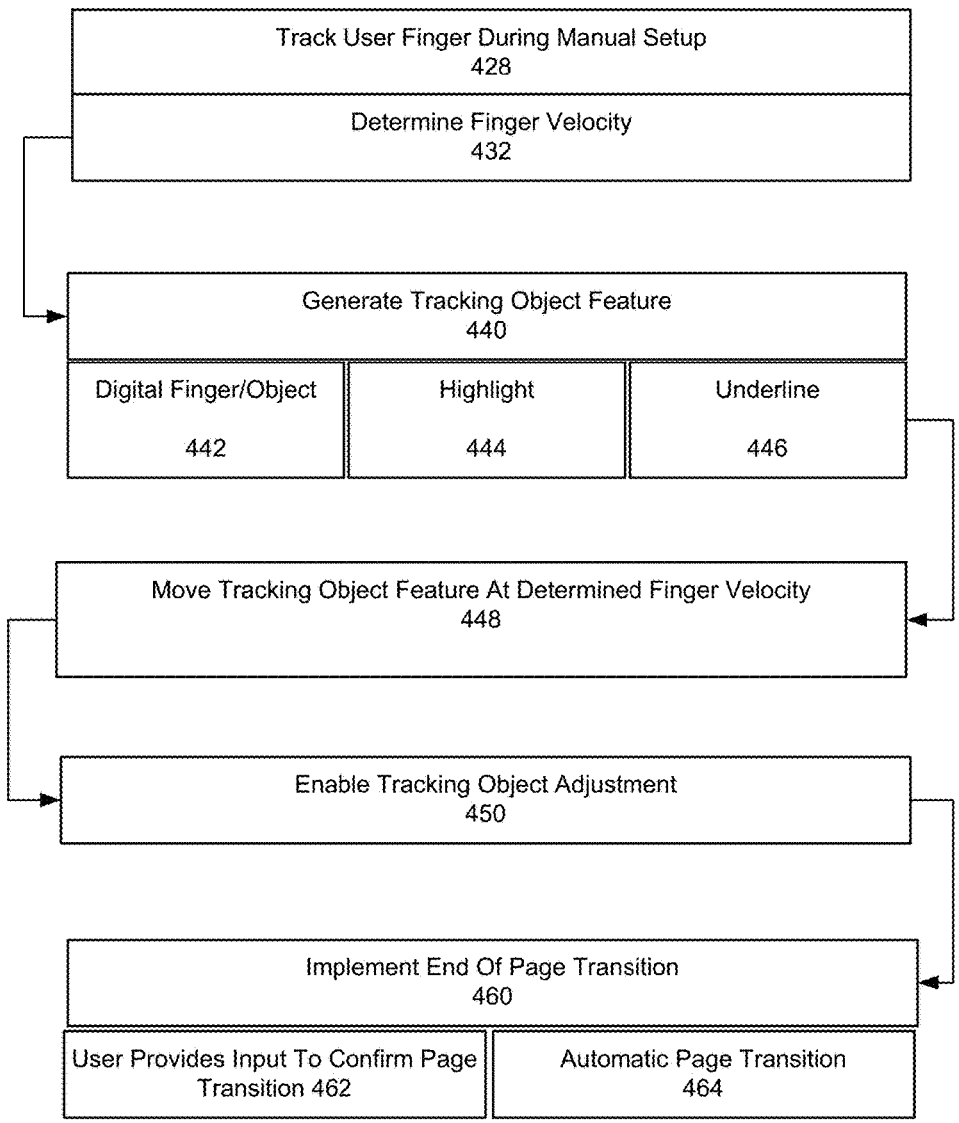
FIG. 4B illustrates an example method for operating an e-reading device to provide a meta guiding mode on which a graphic tracking object feature is provided, according to an embodiment.
Figure 5A:
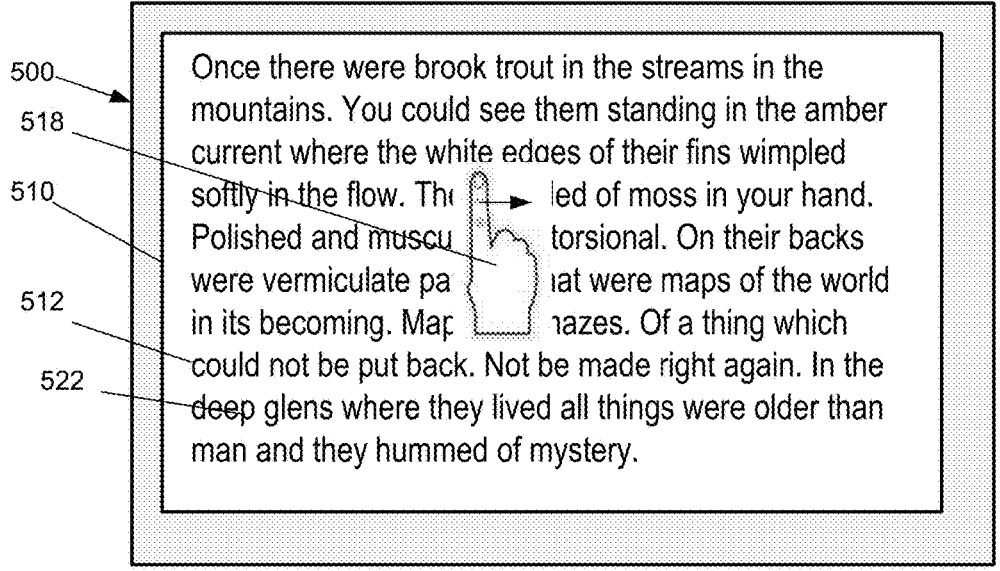
FIG. 5A and FIG. 5B illustrate examples of tracking objects for use with an e-reading device that is operable in a meta guiding mode, according to one or more embodiments.
Figure 5B:
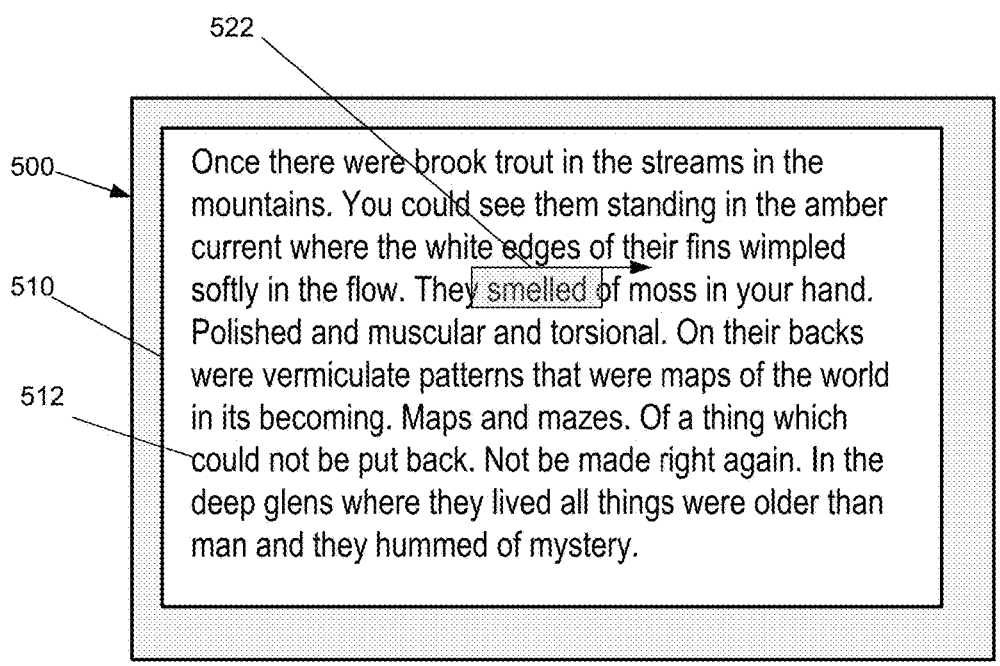

FIG. 4A illustrates an example method for operating an e-reading device to provide a meta guiding mode, according to an embodiment. FIG. 4B illustrates an example method for operating an e-reading device to provide a meta guiding mode on which a graphic tracking object feature is provided, according to an embodiment. In describing example methods of FIG. 4A and FIG. 4B, reference may be made to elements of a system of FIG. 1, an e-reading device of FIG. 2, or an e-reading system of FIG. 3, for purpose of illustrating suitable components for performing a step or sub-step being described.

With reference to FIG. 4A, and the reading device is operated to enable a meta guiding mode (410). The meta guiding mode can be selected for implementation based on, for example, a user preference recorded with a setting of the device or e-reading application (412).

A set of sensor configuration data can be implemented on the reading device for use in the meta guiding mode (420). In one implementation, a processor of the e-reading device can use the sensor configuration data to disable all touch input that can be received through a display screen of the device (422).

In a variation, the processor of the e-reading device can use the sensor configuration data to disable a select set of touch inputs that can be received through the display screen (424). In particular, the touch input that can be disabled include those inputs which correspond to a continuous movement of the user's finger across a measurable length of a touch sensitive display screen.

As an addition or variation, the processor can implement the set of sensor configuration parameters to make some or all of the sensors of the display assembly less sensitive when the meta guiding mode is implemented (426). This reduces the number of inadvertent inputs that are detected from manual meta guiding.

With reference to FIG. 4B, a user finger is tracked when the user performs meta guiding using the e-reading device 110 (428). An initial manual meta guiding by the user can serve as a training are set up process. In particular, the user finger can be tracked to determine a finger velocity of the user when meta guiding is performed (432).

Subsequently, a tracking object feature can be generated on that e-reading device of the user (440). The tracking object feature can take one of many possible forms, based on, for example, a preference of the user. In one implementation, the tracking object feature corresponds to a digital finger or object such as a stylus (442). In the variation, the tracking object corresponds to highlight (444), or an underline (446).

Once the user begins to read in meta guiding form, the tracking object can be moved at the velocity determined for the user (448). If the user prefers a slower or faster speed, the user can provide input to adjust the velocity (450).

At the end of each page, a page transition operation can be performed with the tracking object (460). In one implementation, once the end of the page is encountered by the tracking object, the e-reading device 110 waits until a user input is received, confirming the page transition (462). In another implementation, once the tracking object approaches or arrives at the end of the page (e.g., last word), the e-reading device automatically transitions to the next page (464).

EXAMPLES

FIG. 5A and FIG. 5B illustrate examples of tracking objects for use with an e-reading device that is operable in a meta guiding mode, according to one or more embodiments. In FIG. 5A and FIG. 5B, an e-reading device 500 includes a display screen 510 on which a page 512 from an e-book is rendered. A tracking object 518, 522 can be represented graphically in accordance with a preference of a user or with a system setting. In an example of FIG. 5A, the tracking object 518 is depicted as a virtual finger, to more closely simulate the physical act when meta guiding is performed conventionally (e.g., with a book). In FIG. 5B, the tracking object 522 is provided as a highlight. In other variations, an underline or other graphic objects can be used to enable the user to track the lines and words of a page.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computing device comprising:
a display assembly including a display screen, and a set of sensors that are arranged relative to the display screen to detect user contact with a surface of the display screen;
a memory resource to store sensor configuration data for the set of sensors of the display assembly, including (i) a default set of configuration data that associates a first set of touch inputs with a first set of operations, and (ii) an alternative set of configuration data that associates a second set of touch inputs with the first set of operations, wherein the default set of configuration data provides for individual or collective sensor sensitivity that is more sensitive than that of the alternative set of configuration data;
a processor that operates to:
execute an e-reading component to render an e-book;
when operated in a default mode, use the default set of configuration data to perform the first set of operations in response to the first set of touch inputs on the display screen, wherein the first set of touch inputs includes touch inputs in which a finger or object is moved while in continuous contact with a region of the display screen;

when operated in a meta guiding mode, use the alternative set of configuration data to perform the first set of operations in response to the second set of touch inputs while ignoring the first set of touch inputs including any inputs that correspond to a simultaneous continuous contact and movement of the finger or object on the display screen; and when operated in the meta guiding mode, in response to receiving one of the second set of touch inputs, generate a virtual tracker on the display screen that is configured to simulate a response to one of the first set of touch inputs including the simultaneous continuous contact and movement of the finger or object on the display screen.

2. The computing device of claim 1, wherein the meta guiding mode is enabled only when the computing device launches the e-reading application.

3. The computing device of claim 1, wherein when operated in the meta guiding mode, the processor uses the alternative set of configuration data to ignore or disable all touch inputs.

4. The computing device of claim 3, wherein when operated in the meta guiding mode, the processor automates page transition events.

5. The computing device of claim 4, wherein the processor operates to:
determine a reading speed; and
automate page transition events based on the determined reading speed.

6. The computing device of claim 4, wherein when operated in the meta guiding mode, the processor automates page transition events by generating a graphical tracker object feature that tracks lines of text on pages of the rendered e-book.

7. The computing device of claim 6, wherein a tracking speed of the graphical tracker object feature is adjustable based on user input.

8. The computing device of claim 1, wherein when operated in the meta guiding mode, the processor implements the alternative set of configuration data to ignore touch contact appearing in at least select portions of the display screen.

9. The computing device of claim 1, wherein the one or more processors process a swipe input action on the display screen as a page transition event when operating in the default mod, and wherein the one or more processors process a tap input on the display screen as a page transition even when operating in the meta guiding mode.

10. A method for operating a computing device, the method being implemented by one or more processors and comprising:
storing multiple sets of sensor configuration data on the computing device, including (i) a default set of configuration data that associates a first set of touch inputs with a first set of operations, and (ii) an alternative set of configuration data that associates a second set of touch inputs with the first set of operations, wherein the default set of configuration data provides for individual or collective sensor sensitivity that is more sensitive than that of the alternative set of configuration data,
wherein the default set of configuration data includes data that is executable by the one or more processors to perform the first set of operations in response to the first set of touch inputs on the display screen, wherein the first set of touch inputs includes touch inputs in which a finger or object is displaced on a region of the display screen;

executing an e-reading application to render content from an e-book;

in response to a user input, operating in a meta guiding mode including executing the alternative set of configuration data to cause the one or more processors to perform the first set of operations in response to the second set of touch inputs while ignoring the first set of touch inputs including any inputs that correspond to a simultaneous continuous contact and movement of the finger or object on the display screen; and when operated in the meta guiding mode, in response to receiving one of the second set of touch inputs, generating a virtual tracker on the display screen that is configured to simulate a response to one of the first set of touch inputs including the simultaneous continuous contact and movement of the finger or object on the display screen.

11. The method of claim 10, further comprising enabling meta guiding mode only when the computing device launches the e-reading application.

12. The method of claim 10, further comprising using the alternative set of configuration data to ignore or disable all touch inputs when operating in the meta guiding mode.

13. The method of claim 12, further comprising automating page transition events when operating in the meta guiding mode.

14. The method of claim 13, wherein automating page transition events includes: determining a reading speed; and automating a page transition events based on the determined reading speed.

15. The method of claim 13, wherein automating page transition events includes generating a graphical tracker object feature that tracks lines of text on pages of the rendered e-book.

16. The method of claim 15, wherein generating the graphical tracker object feature includes responding to user input to adjust a speed of the graphical tracker object feature.

17. The method of claim 10, wherein when operated in the meta guiding mode, the processor implements the alternative set of configuration data to ignore touch contact appearing in at least select portions of the display screen.

18. A non-transitory computer-readable medium for use with one or more processors of a computing device, the non-transitory computer-readable medium comprising:
multiple sets of sensor configuration data on the computing device, including (i) a default set of configuration data that associates a first set of touch inputs with a first set of operations, and (ii) an alternative set of configuration data that associates a second set of touch inputs with the first set of operations, wherein the default set of configuration data provides for individual or collective sensor sensitivity that is more sensitive than that of the alternative set of configuration data,
wherein the default set of configuration data includes data that is executable by the one or more processors to perform the first set of operations in response to the first set of touch inputs on the display screen, wherein the first set of touch inputs includes touch inputs in which a finger or object is displaced on a region of a display screen;

executing an e-reading application to render content from an e-book;

in response to a user input, operating in a meta guiding mode including executing the alternative set of configuration data to cause the one or more processors to perform the first set of operations in response to the second set of touch inputs while ignoring the first set of touch inputs including any inputs that correspond to a simultaneous continuous contact and movement of the finger or object on the display screen; and when operated in the meta guiding mode, in response to receiving one of the second set of touch inputs, generating a virtual tracker on the display screen that is configured to simulate a response to one of the first set of touch inputs including the simultaneous continuous contact and movement of the finger or object on the display screen.

19. The computing device of claim 1, wherein the virtual tracker is configured to automatically move at a velocity that is determined from measurements of the movement of the finger or object on the display screen of one of the first set of touch inputs during the default mode.

* * * * *

UNITED STATES PATENT AND TRADEMARK OFFICE
CERTIFICATE OF CORRECTION

Page 1 of 1

PATENT NO. : 10,146,406 B2
APPLICATION NO. : 14/503110
DATED : December 4, 2018
INVENTOR(S) : Benjamin Landau et al.

It is certified that error appears in the above-identified patent and that said Letters Patent is hereby corrected as shown below:

On the Title Page

Item (71) Applicant, change "Kobo Inc., Toronto (CA)" to --Rakuten Kobo Inc., Toronto (CA)--.

In the Specification

Column 2, Line 30, change "a computing device to after" to --a computing device to alter--;

Column 2, Line 66, change "a mulfi-functional computing device" to --a multi-functional computing device--.

Column 10, Line 53, change "after the velocity of the tracking object" to --alter the velocity of the tracking object--.

In the Claims

Column 13, Line 46, change "default mod" to --default mode--.

Signed and Sealed this
First Day of October, 2019

Andrei Iancu
*Director of the United States Patent and Trademark Office*